Patented Aug. 17, 1926.

UNITED STATES PATENT OFFICE.

WILLIAM J. HARSHAW, OF SHAKER HEIGHTS VILLAGE, OHIO, ASSIGNOR TO THE HARSHAW, FULLER & GOODWIN COMPANY, OF CLEVELAND, OHIO, A CORPORATION OF OHIO.

METHOD OF SEPARATING COBALT FROM NICKEL.

No Drawing.  Application filed September 26, 1924. Serial No. 740,046.

The method most generally employed in the commercial separation of cobalt from nickel is the so-called soda bleach method. It will be understood that such separation is effected only after any arsenic, iron, copper and manganese, that may have been present in the original cobalt-nickel ores, have been removed. When a solution of calcium hypochlorite (bleaching powder) is added to such a solution containing cobalt and nickel, the cobalt is precipitated first as a black hydroxide, $Co(OH)_3$. As the process is described in the Report of Ontario Bureau of Mines (1918), Vol. XXVII, Part III, sec. 1, pp. 35, 36, the precipitation may be carried to a colorless solution without precipitating any appreciable quantities of nickel, while if it is desired to obtain pure nickel oxide, the first cobalt hydroxide is removed and the precipitation of the remaining cobalt is continued until the solution is practically free from it, a quantity of black nickel hydroxide, $Ni(OH)_3$, being precipitated at the same time. This intermediate precipitation produces mixed oxides which must be retreated to produce pure cobalt and nickel oxides. The nickel in solution is precipitated as nickelous hydroxide or hydrated carbonate by the addition of a solution of lime or sodium carbonate.

As set forth in the above cited text, it is also customary when cobalt and nickel are present as sulphates to precipitate the cobalt by sodium hypochlorite, instead of calcium hypochlorite, since the lime of the calcium hypochlorite reacts with the sulphate radical to form insoluble calcium sulphate, which is difficult to remove.

One object of the present improved method or process is to obtain a much more selective precipitation of cobaltic hydrate than is possible using such soda bleach method. Another object is to secure, where sulphate solutions of cobalt and nickel are being treated, a resulting nickel sulphate solution that will contain no soluble impurities as the result of the separation.

To the accomplishment of the foregoing and related ends, the invention, then, consists of the steps hereinafter fully described and particularly pointed out in the claims, the following description setting forth in detail one approved method of carrying out the invention, such disclosed mode, however, constituting but one of the various ways in which the principle of the invention may be used.

The present improved method of separation is based upon the use of lead dioxide, or analogous higher oxides, on metallic salts of cobalt and nickel. Taking such lead dioxide, $PbO_2$, which will ordinarily be preferable, I add the same to a solution of the mixed sulphates of the two metals to be separated. The lead dioxide is thereupon decomposed and insoluble cobaltic hydrate and insoluble lead sulphate are formed. The solution will be desirably heated in order to hasten the reaction, which otherwise will require an unreasonable length of time. The two products of the reaction are easily separated from each other by any one of a number of well known methods. The following equations illustrate the reactions that take place, viz:—

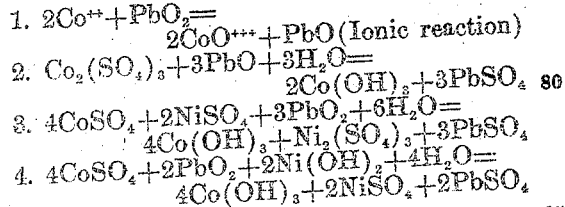

1. $2Co^{++} + PbO_2 = 2CoO^{+++} + PbO$ (Ionic reaction)
2. $Co_2(SO_4)_3 + 3PbO + 3H_2O = 2Co(OH)_3 + 3PbSO_4$
3. $4CoSO_4 + 2NiSO_4 + 3PbO_2 + 6H_2O = 4Co(OH)_3 + Ni_2(SO_4)_3 + 3PbSO_4$
4. $4CoSO_4 + 2PbO_2 + 2Ni(OH)_2 + 4H_2O = 4Co(OH)_3 + 2NiSO_4 + 2PbSO_4$ Instead of adding lead dioxide to the solution, it can of course be formed directly therein by the action of an electric current on lead compounds or metallic lead electrodes in such solution. Lead monoxide, PbO, for example, may in this way be converted into the desired higher oxide. The nascent dioxide so formed will then react immediately with the cobalt salts, forming cobaltic hydrate and lead sulphate, as indicated by the foregoing reaction. Furthermore, lead sulphate—conditions being suitable—can be regenerated into lead dioxide, which will in turn react with more cobalt, so that a complete separation of the cobalt from the nickel by electrolytic means is thus made possible.

As examples of higher oxides other than the lead dioxide specifically referred to, the following may be named, viz, manganese dioxide, $MnO_2$, stannic oxide, $SnO_2$, titanium dioxide, $TiO_2$, and antimony tetroxide, $Sb_2O_4$. In the case of these other oxides, the soluble salts of the corresponding elements will simply be put into the solution and such oxides then formed in the fashion described above for the formation of lead dioxide directly in the solution.

The oxidizing action of lead dioxide exceeds twice the base normally present in the cobalt-nickel solution, so the addition of further base may be found desirable. In such case, litharge or nickel hydroxide, nickel carbonate, or even metallic nickel, may be added.

The precipitation of cobaltic hydrate by my improved method of separation, as already indicated, is very much more selective than is the precipitation obtained where sodium hypochlorite is used. Furthermore, the lead, or analogous element, the oxide of which is thus utilized to convert the cobalt into the form of cobaltic hydrate, forms as a result of the reaction an equally insoluble precipitate so that the residual nickel sulphate solution will contain no soluble impurities as a result of the separation.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of separating cobalt from nickel, the step which consists in adding to a solution of salts of said metals an oxide capable of reacting with the cobalt to form cobaltic hydrate.

2. In a method of separating cobalt from nickel, the step which consists in adding to a solution of the sulphates of said metals an oxide of an element capable of reacting with the cobalt to form cobaltic hydrate.

3. In a method of separating cobalt from nickel, the step which consists in adding lead dioxide to a solution of the salts of said metals, whereby the cobalt is precipitated in the form of cobaltic hydrate.

4. In a method of separating cobalt from nickel, the step which consists in adding lead dioxide to a solution of the sulphates of said metals, whereby the cobalt is precipitated in the form of cobaltic hydrate.

5. In a method of separating cobalt from nickel, the step which consists in electrolyzing a soluble lead compound present in a solution of salts of said first-named metals, whereby lead dioxide is formed, the latter thereupon reacting with the cobalt to form cobaltic hydrate.

6. In a method of separating cobalt from nickel, the step which consists in electrolyzing a solution of salts of said metals using metallic lead anodes, such anodes being thereby oxidized to lead dioxide, and the latter thereupon reacting upon the cobalt to form cobaltic hydrate.

7. In a method of separating cobalt from nickel, the steps which consist in adding an insoluble lead compound to a solution of salts of said first named metals, and electrolytically or otherwise converting this lead compound to lead dioxide, the latter thereby reacting with the cobalt to form cobaltic hydrate.

8. In a method of separating cobalt from nickel, the steps which consist in electrolyzing lead sulphate present in a solution of the sulphates of said first-named metals, whereby lead dioxide is formed, the latter thereupon reacting with the cobalt sulphate to form cobaltic hydrate and lead sulphate, and then electrolyzing such regenerated lead sulphate as before.

Signed by me, this 23rd day of September, 1924.

WILLIAM J. HARSHAW.